United States Patent [19]
Sellstedt

[11] 3,880,835
[45] Apr. 29, 1975

[54] 5-ARYL-3H-1,4-BENZODIAZEPINE-2-PHOSPHONIC ACIDS AND DERIVATIVES

[75] Inventor: John H. Sellstedt, King of Prussia, Pa.

[73] Assignee: American Home Products Corporation, New York, N.Y.

[22] Filed: Sept. 29, 1972

[21] Appl. No.: 293,626

[52] U.S. Cl............................ 260/239 BD; 424/244
[51] Int. Cl............................................. C07d 53/06
[58] Field of Search.............................. 260/239 BD

[56] References Cited
OTHER PUBLICATIONS

Sternbach et al., "Some Aspects of Structure – Activity Relationship in Phychotropic Agents of the 1,4–Benzodiazepine Series," a Symposium held at the Regional Research Laboratory, Hyderbad, India CSIR New Delhi, India (1966).

Primary Examiner—Henry R. Jiles
Assistant Examiner—Robert T. Bond
Attorney, Agent, or Firm—Royal E. Bright

[57] ABSTRACT

Novel 5-aryl-3H-1,4-benzodiazepine-2-phosphonic acids and their lower alkyl and phenyl(lower)alkyl esters which are CNS depressants, and mydriatic agents.

2 Claims, No Drawings

5-ARYL-3H-1,4-BENZODIAZEPINE-2-PHOSPHONIC ACIDS AND DERIVATIVES

BACKGROUND OF THE INVENTION

This invention relates to compositions of matter classified in the art of chemistry as 5-aryl-3H-1,4-benzodiazepines-2-phosphonic acids and their lower alkyl and phenyl(lower)alkyl esters.

SUMMARY OF THE INVENTION

The invention sought to be patented, in its principle composition aspect, is described as residing in the concept of a chemical compound having a structure as illustrated by Formula I:

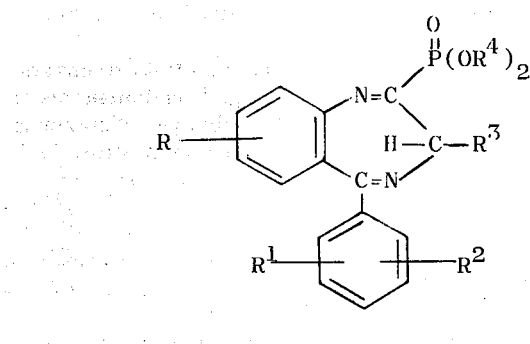

I wherein R is hydrogen, lower alkyl, lower alkyloxy, phenyl, lower alkyloxy phenyl, phenyl(lower)alkyl, heteroaryl, halo, di(lower)alkyl amino, carb(lower)alkyloxy, lower alkylthio, lower alkyl sulfonyl; $R^1$ is hydrogen, lower alkyl, lower alkyloxy, phenyl, lower alkyloxy phenyl, phenyl(lower)alkyl, heteroaryl, halo, di(lower)alkyl amino, carb(lower)alkyloxy, lower alkylthio, lower alkyl sulfonyl; $R^2$ is hydrogen, lower alkyl, lower alkyloxy, phenyl, lower alkyloxy phenyl, phenyl(lower)alkyl, heteroaryl, halo, di(lower)alkyl amino, carb(lower)alkyloxy, lower alkylthio, lower alkyl sulfonyl; $R^3$ is hydrogen, lower alkyl, lower alkyloxy, lower alkanoyloxy, or aroyloxy; $R^4$ is lower alkyl or phenyl(lower)alkyl.

The tangible embodiments of the composition aspect of the invention possess the inherent general physical properties of being white crystalline solids, are substantially insoluble in non-polar hydrocarbon solvents such as hexane and are substantially soluble in aromatic hydrocarbons such as benzene or toluene and oxygenated, non-hydroxylic organic solvents such as diethyl ether. Examination of the compounds produced by the hereinafter described process reveals, upon infrared, ultraviolet, and nuclear magnetic resonance spectrographic analysis, spectral data supporting the molecular structure herein set forth. The aforementioned physical characteristics, taken together with the nature of the starting materials and the mode of synthesis, confirm the structure of the compositions sought to be patented.

The tangible embodiments of the invention possess the inherent applied use characteristics of exerting central nervous system depressant effects and mydriasis upon administration to warm-blooded animals as evidenced by standard pharmacological test procedures.

The invention sought to be patented in a subgeneric composition aspect, is described as residing in the concept of a chemical compound of Formula I$a$

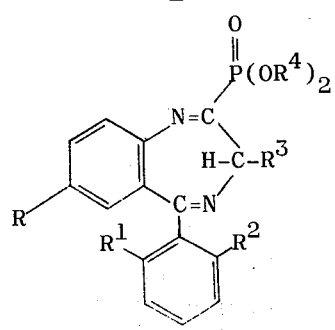

Ia wherein R is hydrogen, halo, trifluoromethyl, or thiomethyl; $R^1$ is hydrogen or halo; $R^2$ is hydrogen or halo; and $R^3$ and $R^4$ are defined hereinabove.

The tangible embodiments of the subgeneric composition aspect of the invention possess the inherent general physical properties of being crystalline solids, are substantially insoluble in non-polar hydrocarbon solvents such as hexane, and are generally soluble in aromatic hydrocarbons such as benzene or toluene, and oxygenated, non-hydroxylic organic solvents such as diethyl ether.

Examination of the compounds produced by the hereinafter described process reveals, upon ultraviolet, infrared, and nuclear magnetic resonance spectrographic analysis spectral data supporting the molecular structure hereinbefore set forth. The aforementioned physical characteristics, taken together with the nature of the starting materials, the mode of synthesis, and the elemental analyses, confirm the structure of the subgeneric compositions sought to be patented.

DESCRIPTION OF THE PREFERRED EMBODIMENT

In describing the process for the preparation of a specific embodiment of the invention, reference will be made to FIG. A wherein the compounds are assigned Roman numerals for identification schematically, and wherein is illustrated schematically the reaction sequence for preparing a specific embodiment of Formula I namely, diethyl 7-chloro-5-(o-chlorophenyl)-3-methoxy-3H-1,4-benzodiazepine-2-phosphonic acid (III).

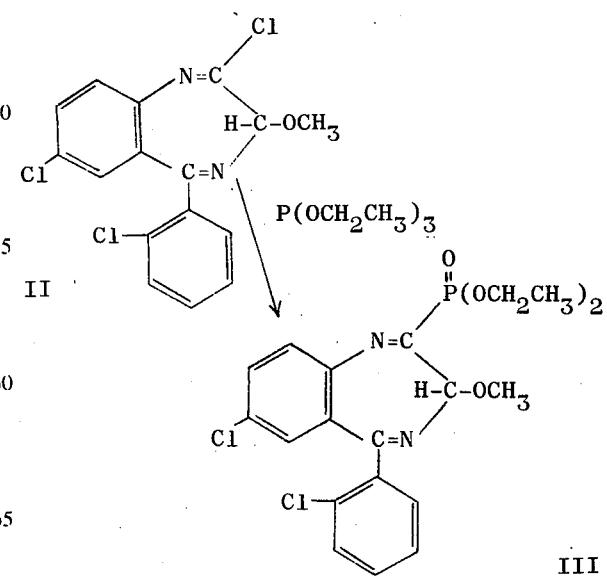

Figure A 2,7 Dichloro-5-(o-chlorophenyl)-3-methoxy-3H-1,4-benzodiazepine (II) is treated with triethyl phosphite at elevated temperature, conveniently steam bath temperature, for a period of time, conveniently, 18 hours, sufficient to allow reaction to occur. Diethyl 7-chloro-5-(o-chlorophenyl)-3-methoxy-3H-1,4-benzodiazepine-2-phosphonic acid (III) is isolated from the reaction mixture by conventional means.

While the process of the application has been described with reference to FIG. A which illustrates its application to the preparation of diethyl 7-chloro-5-(o-chlorophenyl)-3-methoxy-3H-1,4-benzodiazepine-2-phosphonic acid it will be obvious to substitute the variously substituted 7-halo-5-aryl-3H-1,4-benzodiazepines required to prepare the other compositions contemplated within the scope of the invention. Similarly the substitution of other phosphonylating agents such as tribenzylphosphite or trimethyl phosphite will also be obvious.

The starting materials for the practice of the invention are, in the case of the various tri-(lower)alkyl phosphites and tri[phenyl(lower)alkyl]phosphites, commercially available or easily obtainable from preparations well-known in the chemical literature, and are, in the case of the aforementioned 2-halo-5-aryl-3H-1,4-benzodiazepines prepared by treating the appropriate 5-aryl-3H-1,4-benzodiazepin-2-one with a halogenating agent such as $PCl_5$ or $PBr_5$. The 5-aryl-3H-1,4-benzodiazepin-2-ones, are well-known in the literature and may be prepared by methods cited in the article, "The Chemistry of Benzodiazepines" by Giled A. Archer and Leo H. Sternbach in Chemical Review, Volume 68, page 747 (1968), and the references cited therein.

The central nervous system depressant and mydriatic activity of the tangible embodiments of the invention can be elicited by the use of pharmacological procedures well-known in the art. When administered to mice at dosage levels of 400, 127, 40, 12.7, 4.0, 1.27, 0.4, 0.217, and 0.04 mg. per kg., followed by observation over a minimum of two hours, the tangible embodiments of the invention exhibit the effect of inducing general depression of the animals as evidenced by decreased spontaneous motor activity and decreased respiration, loss of righting and pinna reflexes, sedation and ataxia as determined by use of a pole climb and inclined screen, and mydriasis. When administered orally to mice the tangible embodiments of the invention exhibit these effects at a dose of from 1.27 to 400 mg. per kg. of body weight.

The central nervous system depressant activity of the tangible embodiments of the invention is further demonstrated by its antagonism to the effects elicited in warm-blooded animals by certain standard pharmacologic agents. For example, the tangible embodiments of the invention inhibit the clonic and tonic convulsions and death caused by metrazole. To elicit this effect the tangible embodiments are administered orally to groups of six mice, equally divided as to sex. One hour later the animals are challenged with metrazole 125 mg. per kg. i.p. The incidence of clonic and tonic convulsions and death is observed for one-half hour. Relative protection against convulsions and death is determined by comparison with controls run simultaneously. The tangible embodiments of the invention inhibit the clonic convulsions induced by metrazole when administered orally at an $ED_{50}$ of from 3.4 to 27 mg. per kg. of body weight. The tangible embodiments of the invention inhibit tonic convulsions induced by metrazole when administered orally at an $ED_{50}$ of from 1.75 to 3.3 mg. per kg. of body weight. The tangible embodiments of the invention inhibit deaths induced by metrazole when administered orally at an $ED_{50}$ of from 1.75 to 5.4 mg. per kg of body weight. When tested in a procedure described by Holten, C. H. Acta Pharmacologica et Toxicologica vol. 13, page 113 (1957), the tangible embodiments of the invention exhibit the effect of antagonizing the "Straub tail" and circling induced by morphine in mice.

The tangible embodiments of the invention inhibit Straub tail when administered orally at an $ED_{50}$ of from 0.48 to 5.2 mg. per kg. of body weight. The tangible embodiments of the invention inhibit circling when administered orally at an $ED_{50}$ of from 0.51 to 1.75 mg. per kg. of body weight.

Still further demonstration of the central nervous system depressant activity of the tangible embodiments of the invention is provided by their ability to elicit ataxia in experimental animals when tested on the "rotarod." This standard test procedure is described by Dunham and Heya in the Journal of the Pharmaceutical Association, Scientific Edition, 16, 16 page 206 (1957). The tangible embodiments of the invention elicit ataxia when administered orally, to mice, at an $ED_{50}$ of from 9.8 to 375 mg. per kg. of body weight.

When the tangible embodiments of the invention are employed as central nervous system depressants they may be administered to warm-blooded animals, e.g. mice, rats, rabbits, dogs, monkeys and so forth, alone or in combination with pharmacologically acceptable carriers.

The dosage employed upon administration of the tangible embodiments of the invention will vary with the form of administration and the particular compound chosen. Furthermore it will vary with the particular subject under treatment. Generally treatment is initiated with small dosages substantially less than the optimum dose of the compound. Thereafter the dosage is increased by small increments until the optimum effect under the circumstances is reached. In general, the tangible embodiments of the invention are most desirably administered at a concentrative level that will generally afford effective results without causing any harmful or deleterious side effects.

As used herein the term "lower alkyl" means a saturated hydrocarbon radical including the straight and branched chain radicals of from 1 to 6 carbon atoms, among which are for the purposes of illustration, but without limiting the generality of the foregoing, methyl, ethyl and i-butyl. The term "heteroaryl" means an aromatic heterocyclyl radical containing from 3 to 5 carbon atoms and one or more atoms selected from the group nitrogen, oxygen and sulfur, among which are for the purposes of illustration, but without limiting the generality of the foregoing, 2-pyridyl, and 2-pyrimidimyl. The term halo means fluoro, chloro or bromo.

The following examples further illustrate the best mode contemplated by the inventors for carrying out the process of the invention.

EXAMPLE I

Diethyl 7-Chloro-5-(o-Chlorophenyl)-3-Methoxy-3H-1,4-Benzodiazepine-2-Phosphonic Acid 2,7-Dichloro-5-(o-chlorophenyl)-3-methoxy-3H-1,4-benzodiazepine (3.54 g., 0.01 mole) and 15 ml. of triethylphosphite are heated on the steam bath under an atmosphere of $N_2$ for 18 hr. The excess triethylphosphite is stripped off, and the residue dissolved in 15 ml. of ether. Crystals form rapidly, and are filtered and washed with ether, giving 3.1 g., m.p. 131°–133°. Crystallization from toluene (10 ml.)-hexane (40 ml.), gives 2.46 g. of white crystals, m.p. 132°–134°.

Anal. Calcd. for $C_{20}H_{21}Cl_2N_2O_4P$: C, 52.76; H, 4.65; N, 6.15; Cl, 15.58. Found: C, 53.14; H, 4.89; N, 6.29; Cl, 15.37.

EXAMPLE II

Dimethyl 7-Chloro-5-(o-Chlorophenyl)-3-Methoxy-3H-1,4-Benzodiazepine-2-Phosphonic Acid 2,7-Dichloro-5-(o-chlorophenyl)-3-methoxy-3H-1,4-benzodiazepine (7.07 g., 0.02 mole) and trimethylphosphite (25 ml.) are heated on the steam bath under an atmosphere of $N_2$ for 18 hr. The excess trimethylphosphite is stripped off in vacuo, and the residue triturated with xylene. The amber colored residue is triturated twice with hexane, and then dissolved in 100 ml. of ether. The flask is scratched to induce crystal formation. The crystals are filtered and washed with ether, giving 4.28 g., m.p. 121°–123°. Crystallization from toluene (20 ml.)-hexane (40 ml.), gives 3.33 g. of white crystals, m.p. 123°–125°.

Anal. Calcd. for $C_{18}H_{17}Cl_2N_2O_4P$: C, 50.60; H, 4.01; N, 6.56; Cl, 16.60. Found: C, 50.80; H, 4.11; N, 6.44; Cl, 16.32.

The subject matter which the applicants regard as their invention particularly pointed out and distinctly claimed as follows:

1. A compound which is diethyl-7-chloro-5-(o-chlorophenyl)-3-methoxy-3H-1,4-benzodiazepine-2-phosphonic acid.

2. A compound which is dimethyl-7-chloro-5-(o-chlorophenyl)-3-methoxy-3H-1,4-benzodiazepine-2-phosphonic acid.

* * * * *